United States Patent
Mizuno

(10) Patent No.: US 7,615,590 B2
(45) Date of Patent: Nov. 10, 2009

(54) RUBBER COMPOSITION FOR CLINCH AND PNEUMATIC TIRE USING THE SAME

(75) Inventor: Yoichi Mizuno, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 616 days.

(21) Appl. No.: 11/052,879

(22) Filed: Feb. 9, 2005

(65) Prior Publication Data

US 2005/0197445 A1    Sep. 8, 2005

(30) Foreign Application Priority Data

Mar. 3, 2004    (JP) .............................. 2004-059443

(51) Int. Cl.
- *B60C 1/00*    (2006.01)
- *B60C 13/00*    (2006.01)
- *C08K 3/04*    (2006.01)
- *C08K 3/36*    (2006.01)
- *C08L 81/00*    (2006.01)

(52) U.S. Cl. ........................ 524/492; 152/525; 524/495; 524/609

(58) Field of Classification Search ................ 524/492, 524/495, 609; 152/525
See application file for complete search history.

(56) References Cited

U.S. PATENT DOCUMENTS

| | | | | |
|---|---|---|---|---|
| 5,830,930 A | * | 11/1998 | Mahmud et al. | ............ 523/215 |
| 5,869,550 A | * | 2/1999 | Mahmud et al. | ............ 523/215 |
| 6,248,808 B1 | * | 6/2001 | Sone et al. | ................... 523/215 |
| 6,369,151 B1 | * | 4/2002 | Mizuno et al. | .............. 524/492 |
| 2002/0074077 A1 | * | 6/2002 | Ikeda et al. | ................. 156/123 |
| 2002/0169242 A1 | * | 11/2002 | Kawazura | ................... 524/261 |

FOREIGN PATENT DOCUMENTS

| | | |
|---|---|---|
| EP | 0 847 880 A1 | 6/1998 |
| EP | 0 879 847 A1 | 11/1998 |
| EP | 0 896 987 A1 | 2/1999 |
| EP | 0 997 490 A | 5/2000 |
| EP | 1 288 253 A1 | 3/2003 |
| JP | 7-81335 A | 3/1995 |
| JP | 7-118444 A | 5/1995 |
| JP | 7-266813 A | 10/1995 |
| JP | 2000-198883 A | 7/2000 |
| JP | 2001-89598 A | 4/2001 |
| JP | 2001-164051 A | 6/2001 |
| JP | 2001-316526 A | 11/2001 |
| WO | WO-96/37547 A | 11/1996 |
| WO | WO-98/45361 A | 10/1998 |

* cited by examiner

*Primary Examiner*—Timothy J Kugel
(74) *Attorney, Agent, or Firm*—Birch, Stewart, Kolasch & Birch, LLP

(57) ABSTRACT

The present invention provides a rubber composition for a clinch, which highly improves steering stability and elongation properties in a balanced manner. Specifically, the present invention provides a rubber composition for a clinch comprising 20 to 70 parts by weight of carbon black containing silica and 0 to 50 parts by weight of carbon black, based on 100 parts by weight of a rubber component; wherein the total amount of the carbon black containing silica and the carbon black is 50 to 70 parts by weight.

8 Claims, No Drawings

RUBBER COMPOSITION FOR CLINCH AND PNEUMATIC TIRE USING THE SAME

BACKGROUND OF THE INVENTION

The present invention relates to a rubber composition for a clinch comprising carbon black containing silica and a pneumatic tire using the same.

The clinch, which is the chafing part to the rim, is a tire component for receiving heavy load and extremely strong heat history and largely influences steering stability when driving. Therefore, a rubber composition, which has hardness high enough to endure heavy load, high stiffness and low heat generating properties, must be used for the clinch. Also, such a rubber composition must exhibit elongation at break (elongation properties) to a degree that chipping of the toe, which occurs when exchanging tires, does not occur. Furthermore, in recent years, in order to obtain fuel efficiency and reduced weight, simplification of the tire structure, thinning of the rubber gauge and reduction of weight of the cord are progressing and properties required in rubber compositions are becoming increasingly severe. Even for the clinch, a rubber composition having excellent steering stability when running and elongation properties in a balanced manner is desired.

With respect to clinch rubber, for which a great deal of properties are required, disclosed is the art of using polybutadiene rubber containing a syndiotactic component (see JP-A-7-118444). Also, instead of a single rubber composition, a multi-layer structure chafer obtained by joining several types of rubber having different compositions and properties has been invented (see JP-A-7-81335). However, multi-layering of the clinch and chafer rubber increases the load in terms of processes and invention of a clinch rubber composition having excellent balance of the above properties is an urgent task.

Usually, as a reinforcing agent that is compounded in rubber compositions for tires, carbon black and silica are used. However, when carbon black is compounded to a rubber composition alone, there is the problem that elongation at break becomes low and when silica is compounded alone, there is the problem that steering stability under severe conditions becomes poor. In order to compensate for the problems caused by compounding carbon black and silica alone, known is a rubber composition for a tire tread, in which both low rolling resistance and abrasion resistance are achieved by compounding a specific amount of a carbon black material containing silica to the tire tread part (see JP-A-2000-198883). However, this rubber composition is not intended for use as a clinch and a rubber composition for a clinch, which highly improves steering stability and elongation properties in a balanced manner, has not yet been obtained.

SUMMARY OF THE INVENTION

The present invention aims to provide a rubber composition for a clinch, which highly improves steering stability and elongation properties in a balanced manner.

The present invention relates to a rubber composition for a clinch comprising 20 to 70 parts by weight of carbon black containing silica and 0 to 50 parts by weight of carbon black, based on 100 parts by weight of a rubber component; wherein the total amount of the carbon black containing silica and the carbon black is 50 to 70 parts by weight.

The rubber composition preferably comprises sulfur and a vulcanization accelerator and the ratio of the amount of the sulfur to the amount of the vulcanization accelerator is preferably 1/4 to 1/2.

The present invention also relates to a pneumatic tire using the rubber composition for a clinch.

DETAILED DESCRIPTION

The rubber composition for a clinch of the present invention comprises a rubber component, carbon black that contains silica (carbon black containing silica) and carbon black. The clinch is the part of a tire that directly contacts with the wheel along the range of the sidewall to the bead.

The rubber component can be any rubber component that is commonly used in rubber compositions for tires and is not particularly limited.

Examples of the rubber component are natural rubber (NR), butadiene rubber (BR), isoprene rubber (IR), styrene-butadiene copolymer rubber (SBR), butyl rubber (IIR), acrylonitrile-sytrene-butadiene copolymer rubber and chloroprene rubber (CR). These can be used alone or two or more kinds can be used together. Of these, NR, BR and IR are preferably used for the rubber composition for a clinch.

The rubber component preferably contains 30 to 50% by weight of NR and/or IR and 50 to 70% by weight of BR. When the content of NR and/or IR is less than 30% by weight or the content of BR is more than 70% by weight, processability when kneading with a roll decreases, adhesion of the obtained rubber composition with the tire inner layer becomes poor and heat generating properties tend to become poor. When the content of NR and/or IR is more than 50% by weight and the content of BR is less than 50%, chafing properties tend to become poor.

The carbon black containing silica that is used in the present invention refers to a substance in which carbon black and silica are three-dimensionally mixed in one particle and both carbon black and silica are exposed from the particle surface. Due to the above structure, carbon black containing silica has, in one particle, a carbon black part, which has few of functional groups present on the surface and low chemical bonding ability with polymers, and a silica part, which has many functional groups present on the surface and bonds with polymers via a binder to reduce hysteresis loss. By using carbon black containing silica, in which chemical bonding ability with polymers is increased by containing silica in carbon black, both steering stability and elongation properties can be achieved.

In the carbon black containing silica, part of both the carbon black part and the silica part are exposed from the particle surface and most of the carbon black part is not covered by silica, as in the case of carbon black that is surface-treated by silica. Consequently, elongation at break of the clinch under severe conditions is sufficiently improved, which is a feature obtained by using carbon black. Also, due to containing silica, the number of surface activity points of carbon black containing silica is more than that of normal carbon black, bound rubber increases and stiffness of the clinch can be improved.

The process for preparing carbon black containing silica is not particularly limited, but preferable is the process of preparing carbon black containing silica in one step by simultaneously reacting organic siloxane with the raw material oil. This preferable preparation method is disclosed in detail in for example, WO96/37547.

In the carbon black containing silica, the weight ratio of silica to carbon black is preferably 0.1 to 25% by weight. The lower limit of the weight ratio is more preferably 0.5% by weight, further preferably 2% by weight. The upper limit of the weight ratio is more preferably 10% by weight, further preferably 6% by weight. When the weight ratio is less than 0.1% by weight, improvement of elongation at break tends to be insufficient and when the weight ratio is more than 25% by weight, steering stability tends to decrease.

The content of the carbon black containing silica is 20 to 70 parts by weight based on 100 parts by weight of the rubber component. The lower limit of the content is preferably 25 parts by weight, more preferably 30 parts by weight. The upper limit of the content is preferably 65 parts by weight, more preferably 70 parts by weight. When the content is less than 20 parts by weight, the effect of improving elongation at break is small and when the amount is more than 70 parts by weight, elongation at break decreases.

The nitrogen-adsorbing specific surface area ($N_2SA$) of the carbon black containing silica is preferably 70 to 300 $m^2/g$. The lower limit of $N_2SA$ is more preferably 100 $m^2/g$ and the upper limit is more preferably 250 $m^2/g$. When $N_2SA$ is less than 70 $m^2/g$, reinforcing properties are low and elongation tends to decrease. When $N_2SA$ is more than 300 $m^2/g$, heat generation increases too much that durability tends to become poor.

The DBP adsorption of the carbon black containing silica is preferably 70 to 200 ml/100 g. The lower limit of the DBP adsorption is more preferably 90 ml/100 g and the upper limit is more preferably 150 ml/100 g. When the DBP adsorption is less than 70 ml/100 g, stiffness necessary for steering stability tends to decrease and when the DBP adsorption is more than 200 ml/100 g, elongation becomes poor and processability when preparing the rubber composition tends to become poor.

Besides the carbon black containing silica, the rubber composition for a clinch of the present invention can contain carbon black, which is usually used as a reinforcing agent.

The content of carbon black is preferably 0 to 50 parts by weight based on 100 parts by weight of the rubber component. The lower limit of the content is more preferably 10 parts by weight, and the upper limit is more preferably 45 parts by weight. When the content is more than 50 parts by weight, elongation tends to become poor.

The total amount of the carbon black containing silica and carbon black is 50 to 70 parts by weight based on 100 parts by weight of the rubber component. The lower limit of the total amount is preferably 50 parts by weight, more preferably 55 parts by weight. The upper limit of the total amount is preferably 65 parts by weight, more preferably 70 parts by weight. When the total amount is less than 50 parts by weight, the effect of improving steering stability and elongation at break in a balanced manner is insufficient. When the total amount is more than 70 parts by weight, the change in elongation at break due to aging is large and a favorable rubber composition cannot be obtained.

The nitrogen-adsorbing specific surface area ($N_2SA$) of the carbon black is preferably 60 to 130 $m^2/g$. When $N_2SA$ is less than 60 $m^2/g$, elongation tends to decrease. When $N_2SA$ is more than 130 $m^2/g$, heat generation increases too much that durability tends to become poor.

To the rubber composition for a clinch of the present invention, sulfur as a vulcanizing agent and a vulcanization accelerator such as a sulfeneamide-type are compounded.

The ratio of the amount of sulfur to the amount of the vulcanization accelerator is preferably 1/4 to 1/2. When the ratio is smaller than 1/4, the crosslinking mode of the obtained rubber composition changes significantly and not only does steering stability become poor but also elongation at break tends to decrease. When the ratio is larger than 1/2, change in properties of the rubber composition by running is large, thus being unfavorable.

In the rubber composition for a clinch of the present invention, a silane coupling agent is preferably used together with the carbon black containing silica. Examples of the silane coupling agent are Si69 (bis-(3-triethoxysilylpropyl)tetrasulfide) and Si266 (bis-(3-triethoxysilylpropyl)disulfide) available from Degussa Co. Of these, for the reason that processability is favorable, Si266 is preferably used.

The amount of the silane coupling agent is preferably 2 to 8 parts by weight based on the 100 parts by weight of the carbon black containing silica. When the amount is less than 2 parts by weight, the coupling effect with silica is insufficient and elongation tends to become poor. When the amount is more than 8 parts by weight, properties cannot be improved and costs tend to become high.

A commonly used softening agent such as a process oil is preferably compounded to the rubber composition for a clinch of the present invention.

Besides the above, additives that are usually used in the rubber industry such as reinforcing agents such as silica, various antioxidants, wax, stearic acid and zinc oxide can be compounded to the rubber composition of the present invention.

The pneumatic tire of the present invention uses the rubber composition of the present invention for a clinch and is prepared by the usual method.

Hereinafter, the present invention is described in detail based on Examples, but the present invention is not limited thereto.

NR: RSS#3
BR 1: BR 130B available from Ube Industries, Ltd.
BR 2: VCR 412 available from Ube Industries, Ltd.
Carbon black 1: Diablack I (N220) ($N_2SA$: 114 $m^2/g$) available from Mitsubishi Chemical Corporation
Carbon black 2: Seast N (N330) ($N_2SA$: 74 $m^2/g$) available from Tokai Carbon Co., Ltd.
Carbon black 3: SHOWBLACK N550 ($N_2SA$: 42 $m^2/g$) available from Showa Cabot Co., Ltd.
Silica: Ultrasil VN3 available from Degussa Co.
Carbon black containing silica: CRX2000 (containing 4.7% by weight of silica in N234 carbon black, $N_2SA$: 154.3 $m^2/g$, DBP oil absorption: 113 ml/100 g, iodine-adsorbing specific surface area: 122 g/kg) available from Showa Cabot Co., Ltd.
Process oil: Diana Process Oil AH40 available from Idemitsu Kosan Co., Ltd.
Silane coupling agent: Si266 (bis-(3-triethoxysilylpropyl) disulfide) available from Degussa Co.
Antioxidant: Ozonone 6C available from Seiko Chemical Co., Ltd.
Wax: SUNNOC WAX available from Ouchi Shinko Chemical Industrial Co., Ltd.
Stearic acid: KIRI available from NOF Corporation
Zinc oxide: Ginrei R available from Toho Zinc Co., Ltd.
Sulfur: Sulfur available from Tsurumi Chemicals Co., Ltd.
Vulcanization accelerator: Nocceler NS (N-tert-butyl-2-benzothiazolylsulfenamide) available from Ouchi Shinko Chemical Industrial Co., Ltd.

EXAMPLES 1 TO 12 AND COMPARATIVE EXAMPLES 1 TO 6

The components shown in Table 1 other than sulfur and the vulcanization accelerator, 3 parts by weight of the antioxidant, 2 parts by weight of wax, 1 part by weight of stearic acid and 5 parts by weight of zinc oxide, based on 100 parts by weight of rubber, were kneaded with a banbury for 5 minutes at about 150° C. Then, sulfur and the vulcanization accelerator were added to the obtained rubber composition in the amounts shown in Table 1 and the mixture was kneaded using a twin-screw open roll for 5 minutes at about 80° C.

A tire was molded by the usual preparation method using the obtained rubber composition for a clinch. Vulcanization was conducted under conditions of 175° C., 12 minutes and 20 kgf and a 225/55R17 tire for an automobile was prepared.

(Hardness)

The rubber hardness of a new clinch was measured using a JIS-A hardness meter at 25° C.

(Viscoelasticity Test)

A sample was prepared from the clinch rubber composition of a new tire and complex modulus E* was measured using a viscoelasticity spectrometer made by Iwamoto Corporation at 60° C. under the conditions of frequency of 10 Hz and dynamic strain of 1.0%. The smaller the value is the larger the E* value, the better the steering stability and the more superior the chafing properties.

(Steering Stability Test by Actual Driving)

The prepared tire was mounted on a 3000 cc high performance vehicle and the steering stability test was conducted by running 5 laps on a circuit course, 1 lap being about 3 km, at a temperature of 20° C. 3 signifies that steering stability is favorable, 2 signifies that stiffness is somewhat insufficient and 1 signifies that stiffness is insufficient.

(Tensile Test)

The tensile test was conducted for the clinch composition of a new tire according to JIS K6251 using a type-3 dumbbell and the elongation at break EB (%) was measured. (O) represents data of properties of a new product and (A) represents data of properties after 100 hours of aging in an 80° C. oven. The rate of retention (%) is represented by $$EB(A)/EB(O) \times 100$$

and the larger the value is the less the change in properties, thus being favorable.

(Appearance after Steering Stability Test by Actual Driving)

The appearance of the clinch after the steering stability test by actual driving was compared and presence of chafing was visually observed. ○ signifies that the appearance was favorable, Δ signifies that some chafing occurred and x signifies that a great deal of chafing occurred.

The test results are shown in Table 1.

TABLE 1

| | Ex. | | | | | | | | | | | | Com. Ex. | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 1 | 2 | 3 | 4 | 5 | 6 |
| Composition (parts by weight) | | | | | | | | | | | | | | | | | | |
| NR | 40 | 40 | 40 | 40 | 40 | 40 | 40 | 40 | 40 | 40 | 40 | 40 | 40 | 40 | 40 | 40 | 40 | 40 |
| BR1 | 60 | 60 | 60 | 60 | 60 | 60 | 60 | 60 | 60 | — | 60 | 60 | 60 | 60 | 60 | 60 | 60 | 60 |
| BR2 | — | — | — | — | — | — | — | — | — | 60 | — | — | — | — | — | — | — | — |
| Carbon black 1 | — | 10 | 20 | 30 | 40 | — | — | — | — | — | — | — | 60 | — | — | 30 | 50 | — |
| Carbon black 2 | — | — | — | — | — | — | — | — | — | — | — | — | — | 60 | — | — | — | — |
| Carbon black 3 | — | — | — | — | — | — | — | — | — | — | — | — | — | — | 60 | — | — | — |
| Silica | — | — | — | — | — | — | — | — | — | — | — | — | — | — | — | 30 | — | — |
| Carbon black containing silica | 60 | 50 | 40 | 30 | 20 | 50 | 70 | 60 | 60 | 60 | 60 | 60 | — | — | — | — | 10 | 80 |
| Process Oil | 7 | 7.5 | 8 | 8.5 | 9 | — | 12 | 8.5 | 10 | 20 | 5 | 12 | 10 | 5 | — | 8.5 | 9.5 | 17 |
| Silane coupling agent | 2.4 | 2 | 1.6 | 1.2 | 0.8 | — | 2.8 | 2.4 | 2.4 | 2.4 | 2.4 | 2.4 | — | — | — | 2.4 | 0.4 | 3.2 |
| Sulfur | 1 | 1 | 1 | 1 | 1 | 1 | 1 | 1 | 1 | 1 | 1 | 1 | 1 | 1 | 1 | 1 | 1 | 1 |
| Vulcanization accelerator | 2.5 | 2.5 | 2.5 | 2.5 | 2.5 | 2.5 | 2.5 | 2 | 4 | 2 | 1.5 | 5 | 2.5 | 2.5 | 2.5 | 2.5 | 2.5 | 2.5 |
| Test results | | | | | | | | | | | | | | | | | | |
| Hardness | 65 | 64 | 65 | 65 | 66 | 65 | 66 | 65 | 65 | 66 | 64 | 66 | 65 | 64 | 65 | 64 | 65 | 65 |
| E * (MPa) | 7 | 6.8 | 6.8 | 6.9 | 7 | 6.7 | 7.1 | 7.2 | 7.2 | 7.6 | 6.7 | 7.5 | 7 | 6.4 | 4.2 | 6.8 | 7.1 | 7.2 |
| Steering stability by actual driving | 3 | 3 | 3 | 3 | 3 | 3 | 3 | 3 | 3 | 3 | 3 | 2 | 3 | 2 | 1 | 2 | 3 | 3 |
| Tensile properties | | | | | | | | | | | | | | | | | | |
| EB(O)(%) | 340 | 330 | 315 | 310 | 305 | 320 | 300 | 335 | 320 | 315 | 310 | 290 | 290 | 270 | 210 | 340 | 290 | 280 |
| EB(A)(%) | 180 | 175 | 170 | 165 | 165 | 170 | 150 | 180 | 220 | 165 | 140 | 220 | 160 | 155 | 110 | 210 | 150 | 130 |
| Rate of retention (%) | 53 | 53 | 54 | 53 | 54 | 53 | 50 | 54 | 69 | 52 | 45 | 76 | 55 | 57 | 52 | 62 | 52 | 46 |
| Appearance of chafing after evaluation of steering stability by actual driving | ○ | ○ | ○ | ○ | ○ | ○ | ○ | ○ | ○ | ○ | ○ | Δ | ○ | ○ | x | Δ | ○ | ○ |

From a comparison of Examples and Comparative Examples, it can be seen that balance of steering stability and elongation properties is favorable when carbon black containing silica is used.

According to the present invention, by compounding a specific amount of carbon black containing silica and carbon black to rubber and using the obtained rubber composition for the clinch of a tire, steering stability and elongation properties can be highly improved in a balanced manner.

What is claimed is:

1. A pneumatic tire having a clinch which is comprised of a rubber composition comprising:
    20 to 70 parts by weight of carbon black containing silica,
    0 to 50 parts by weight of carbon black,
    sulfur, and
    vulcanization accelerator, based on 100 parts by weight of a rubber component;
wherein the total amount of said carbon black containing silica and said carbon black is 50 to 70 parts by weight; the ratio of the amount of said sulfur to the amount of said vulcanization accelerator is 1/4 to 1/2; and the amount of said vulcanization accelerator is 2 to 4 parts by weight.

2. The pneumatic tire according to claim 1, wherein the content of the carbon black containing silica is 30 to 70 parts by weight and the content of the carbon black is 10 to 45 parts by weight, based on 100 parts by weight of the rubber component.

3. The pneumatic tire according to claim 2, wherein the sulfur is present in an amount of one part by weight based on 100 parts by weight of the rubber component.

4. The pneumatic tire according to claim 1, wherein the sulfur is present in an amount of one part by weight based on 100 parts by weight of the rubber component.

5. A pneumatic tire having a clinch which is comprised of a rubber composition comprising:
   20 to 70 parts by weight of carbon black containing silica,
   0 to 50 parts by weight of carbon black,
   sulfur, and
   vulcanization accelerator,
   based on 100 parts by weight of a rubber component;
   wherein the total amount of said carbon black containing silica and said carbon black is 50 to 70 parts by weight; the ratio of the amount of said sulfur to the amount of said vulcanization accelerator is 1/4 to 1/2; the elongation at break EB for the clinch when subjected to the tensile test JIS K6251 using a type-3 dumbbell is 300% or greater; and the amount of said vulcanization accelerator is 2 to 4 parts by weight.

6. The pneumatic tire according to claim 5, wherein the content of the carbon black containing silica is 30 to 70 parts by weight and the content of the carbon black is 10 to 45 parts by weight, based on 100 parts by weight of the rubber component.

7. The pneumatic tire according to claim 6, wherein the sulfur is present in an amount of one part by weight based on 100 parts by weight of the rubber component.

8. The pneumatic tire according to claim 5, wherein the sulfur is present in an amount of one part by weight based on 100 parts by weight of the rubber component.

* * * * *

UNITED STATES PATENT AND TRADEMARK OFFICE
CERTIFICATE OF CORRECTION

PATENT NO.        : 7,615,590 B2
APPLICATION NO. : 11/052879
DATED             : November 10, 2009
INVENTOR(S)       : Yoichi Mizuno It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 849 days.

Signed and Sealed this

Nineteenth Day of October, 2010

David J. Kappos
*Director of the United States Patent and Trademark Office*